United States Patent [19]
Coville et al.

[11] Patent Number: 5,359,491
[45] Date of Patent: Oct. 25, 1994

[54] CAPACITIVE SENSOR COMPRISING A CONDUCTIVE FRONT SURFACE FOR FORMING A CAPACITOR PLATE, AND A COAXIAL CABLE SHIELDED BY A MINERAL INSULATOR

[75] Inventors: Patrick Coville, Le Chesnay; Modeste Renard, Epinay sur Orge, both of France; Gilles Bailleul, Dunwoody, Ga.

[73] Assignee: U.S. Philips Corporation, New York, N.Y.

[21] Appl. No.: 972,189

[22] Filed: Nov. 5, 1992

[30] Foreign Application Priority Data

Nov. 27, 1991 [FR] France .................. 91 14673

[51] Int. Cl.⁵ .............................................. H01G 7/00
[52] U.S. Cl. ..................................... 361/280; 361/282; 29/592.1
[58] Field of Search ................ 361/280, 282, 181; 374/142, 144; 29/631.1, 592.1

[56] References Cited

U.S. PATENT DOCUMENTS 2,802,178  8/1957  Shafer .
4,950,084  8/1990  Bailleul .

FOREIGN PATENT DOCUMENTS 0246576  11/1987  European Pat. Off. .

Primary Examiner—Marvin M. Lateef
Attorney, Agent, or Firm—Paul R. Miller

[57] ABSTRACT

The capacitive sensor comprises a sensor body which includes a housing, a conductive front surface and insulation means provided between the conductive surface and the housing; it also comprises a coaxial cable of the type shielded by a mineral insulator for the connection of the conductive surface to a device for measuring the capacitance of the system formed by the conductive surface, constituting a first capacitor plate, and a reference conductive surface which is arranged opposite to and at a given distance from the first plate and which constitutes a second capacitor plate. The body of the sensor is formed by an electrically open extension of the coaxial cable shielded by a mineral insulator in which the free end of the core constitutes the conductive surface, the extension of the sheath constitutes the housing, and the insulation means consist of a mineral insulator.

10 Claims, 4 Drawing Sheets

CAPACITIVE SENSOR COMPRISING A CONDUCTIVE FRONT SURFACE FOR FORMING A CAPACITOR PLATE, AND A COAXIAL CABLE SHIELDED BY A MINERAL INSULATOR

FIELD OF THE INVENTION

The invention relates to a capacitive sensor, comprising a sensor body which includes a housing, a conductive front surface and insulating means provided between the conductive surface and the housing, and also comprising a coaxial cable of the type shielded by a mineral insulator for connecting the conductive surface to a device for measuring the capacitance of the system formed by the conductive surface, constituting a first capacitor plate, and a reference conductive surface which is arranged opposite thereto and at a given distance therefrom and which constituted a second capacitor plate.

A coaxial cable shielded by a mineral insulator is to be understood to mean a coaxial cable whose sheath is metallic and insulated from the core by a compacted powdery mineral insulator.

The invention is used, for example in the field of aeronautics for measuring the clearance between the extremity of the rotating blades of a turbo-engine and the casing.

BACKGROUND OF THE INVENTION

A sensor of this kind is already known from European Patent Application EP-0 334 441.

This sensor comprises a sensor body formed by a housing and a conductive front surface, with an intermediate piece for insulating the conductive surface from the housing. This sensor also comprises a coaxial cable for connecting the conductive surface to a device for measuring the capacitance.

The conductive surface is to be aligned with the internal surface of the casing of a turbo-engine in the field of aeronautics. The measurement of the capacitance occurring between the conductive surface of the sensor and the end of the rotating blades of the engine reveals the clearance existing, in the dynamic state, between these extremities and the casing.

This sensor also enables measurement of the temperature at the point of measurement of the capacitance. To this end, the core of the coaxial cable consists of the two wires of a thermocouple, the welding point of which is in electrical and thermal contact with the conductive front surface of the sensor body. The wires of the thermocouple thus transport the electric measurement signal for the temperature as well as the electric measurement signal for the capacitance.

The complete device is suitable to withstand the very high temperatures prevailing within the turbojet. The coaxial cable is of the type shielded by a mineral insulator. The sheath of the coaxial cable is formed by a metallic cylinder having a very small diameter, i.e. in the order of from 1 to 2 min. The core is insulated from the sheath by a compacted mineral insulator. The sheath is cut at one end of the cable so as to expose the welding point and the wires of the thermocouple over a small length.

The welding point of the thermocouple is sealed to the conductive surface reinforced by a metallic electrode. The intermediate insulation piece is sealed on the one side to the housing and to the other side to the electrode. Moreover, the housing is sealed to the metallic sheath of the coaxial cable for tightness of the sensor assembly. Moreover, all parts are made of a refractory material.

The described device nevertheless has drawbacks. First of all, its manufacture necessitates the use of a large number of different elements, which is expensive. The pieces must be very exactly adjusted, which is also expensive.

Secondly, the number of seals is large, and the seals are susceptible to vibrations. However, depending on the type of engine in which the sensor is used, the vibrations may be very different and very destructive in given cases.

SUMMARY OF THE INVENTION

Therefore, it is one of the objects of the invention to provide a capacitive sensor whose manufacture involves fewer elements.

It is another object of the invention to provide a sensor of this kind which comprises a smaller number of seals.

In accordance with the invention, a sensor of the kind set forth is characterized in that the sensor body consists of an electrically open extension of the coaxial cable shielded by a mineral insulator, the free end of the core constituting the conductive surface whereas the extension of the sheath constitutes the housing and the insulation means are formed by the mineral insulator.

The advantage of this sensor resides in the fact that the number of constituent elements is minimized, this number being reduced to the essential elements of the cable itself: the core, the metallic sheath and the mineral insulator.

Another advantage resides in the fact that it is no longer necessary to use special pieces, having exact sides for perfect alignment, in order to realise the body of the housing as well as possible. This results in a substantial saving in respect of manufacture and assembly.

This saving is not achieved at the expense of the quality of the sensor, because all pieces are refractory and mounted without sealing. The temperature and vibration behaviour are thus substantially improved.

In an embodiment, the diameter of the sensor body amounts to at least twice the diameter of the cable. For example, the diameter of the sensor body of the sensor may amount to from 2 to 4 times that of the cable. This embodiment offers the advantage that the sensor body can be readily positioned within the engine and can be retained on the housing by the equivalent part, and that the cable of small diameter has a flexibility allowing for adaptation to any support and for transporting the information to locations remote from the engine.

In an embodiment, the cable and the sensor body comprise two concentric metallic sheaths which are separated by a compacted powdery mineral insulator. This sensor thus offers the advantage that the intermediate sheath can serve as a shielding ring so as to supply the measurement of the capacitance between the reference surface and the shielding ring. A differential measurement applied to the measurement of the capacitance between the reference surface and the core of the sensor enables elimination of the effect of the parasitic capacitance of the cable. The measurement of the capacitance is thus improved.

In an embodiment, the free end of the sensor is provided with a refractory insulating cap which leaves exposed the end of the core serving, as the conductive surface, as well as that of the intermediate sheath. In this embodiment the sensor offers the advantage that it is tight and still comprises a minimum number of seals: a single seal, being that of the cap.

In an embodiment, the core is a single central conductor, so that the sensor is purely capacitive.

In an alternative embodiment, the core is formed by the two wires of a thermocouple, the welding point of the thermocouple being used as the conductive surface to constitute said first plate of the capacitor. In this case the sensor provides a measurement of the capacitance as well as a measurement of the temperature at a given point.

BRIEF DESCRIPTION OF THE DRAWINGS

The invention will be described in detail hereinafter with reference to the accompanying diagrammatic drawings; therein:

FIG. 3b is a transverse sectional view, taken along the line B—B, of the sensor shown in FIG. 3a;

DESCRIPTION OF EMBODIMENTS

Figure 1:
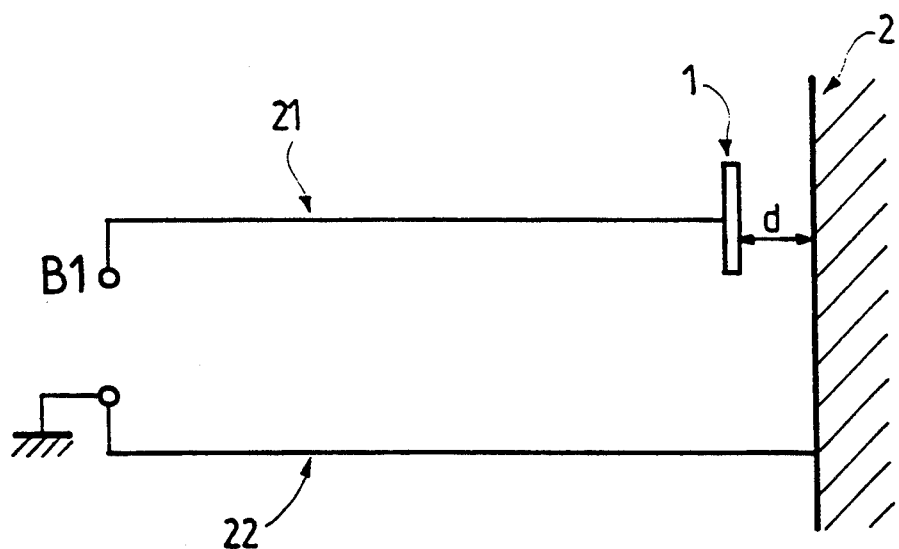
FIG. 1 illustrates the operating principle of a capacitive sensor.

Referring to FIG. 1, a capacitive sensor comprises a conductive surface or first capacitor plate 1. This conductive surface is to be arranged opposite a second conductive surface or second capacitor plate 2. The sensor serves to measure the value of the capacitance of the capacitor formed by the two plates 1 and 2 which are separated by a given distance d. The second plate 2 may be stationary or mobile and the value of the distance d may be variable. For the measurement of this capacitance, the first plate 1 is connected to the core of a coaxial cable, and the second plate 2 is connected to the sheath of the coaxial cable by ground. The core and the sheath of the coaxial cable are connected terminals B1 and ground of a capacitance measuring device which supplies a first capacitance value C1.

A sensor of this kind enables measurement of notably the clearance, in dynamic circumstances, between the casing of a turbo-engine and the rotating plates. To this end, the first plate 1 is mounted so as to be aligned with the internal surface of the casing and opposite an array of rotating blades. Each blade end constitutes the second plate 2 of the capacitor when it passes in front of the first plate 1. Knowledge of the capacitance of the capacitor 1, 2 enables deduction of the distance d separating the plates, and hence of the clearance between blades and casing in the turbo-engine. This knowledge is necessary for controlling the operation of the engine. The sheath of the coaxial cable is metallic. Thus, a non-negligible capacitance occurs between the sheath and the core of the coaxial cable.

Figure 2:
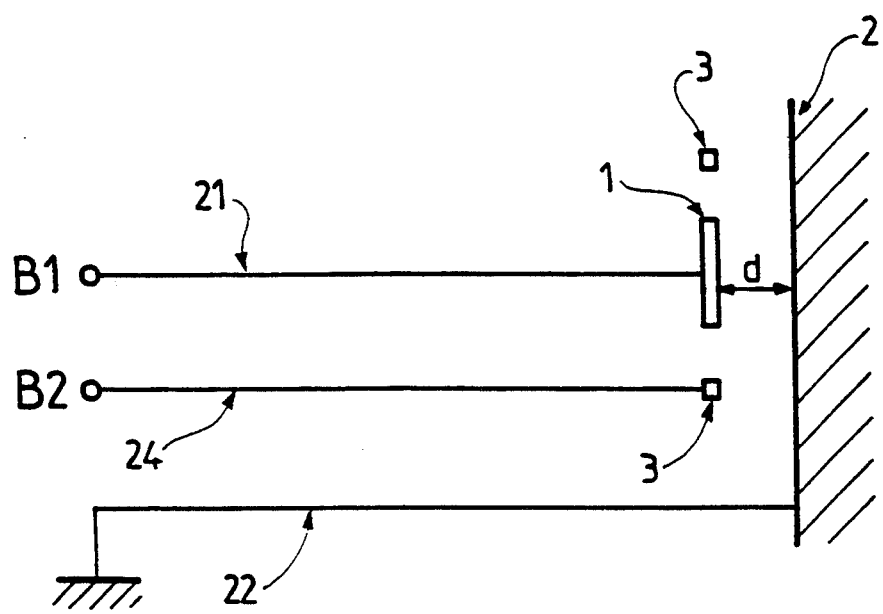
FIG. 2 illustrates the operating principle of a capacitive sensor provided with a shielding ring.

Referring to FIG. 2, the capacitive sensor comprises a supplementary conductive surface or plate 3. This supplementary conductive surface 3 is also to be arranged opposite the second plate 2. This supplementary conductive surface or plate 3 has an annular shape, because it is connected to an metallic intermediate sheath of the coaxial cable. A disturbing capacitance of the coaxial cable thus appears between this intermediate sheath and the external sheath. When the metallic intermediate sheath is connected to the terminal B2 of the capacitance measuring device, a second capacitive value C2 relative to the capacitor formed by the supplementary conductive surface 3 and the reference surface 2, becomes known.

A differential measurement of the values C1 and C2 reveals the value of the capacitance relative to said first and second plates 1 and 2, freed as well as possible from the stray capacitance due to the sheath of the coaxial cable.

Figure 3B:
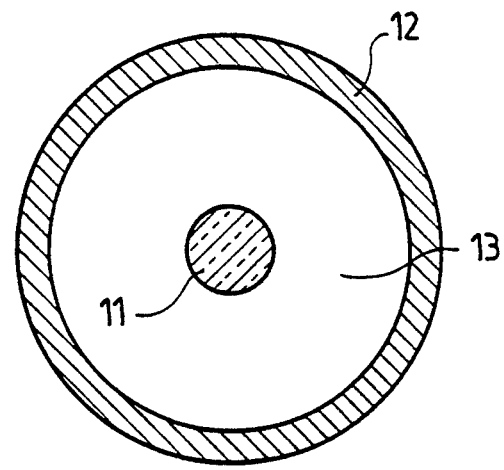
Figure 3A:
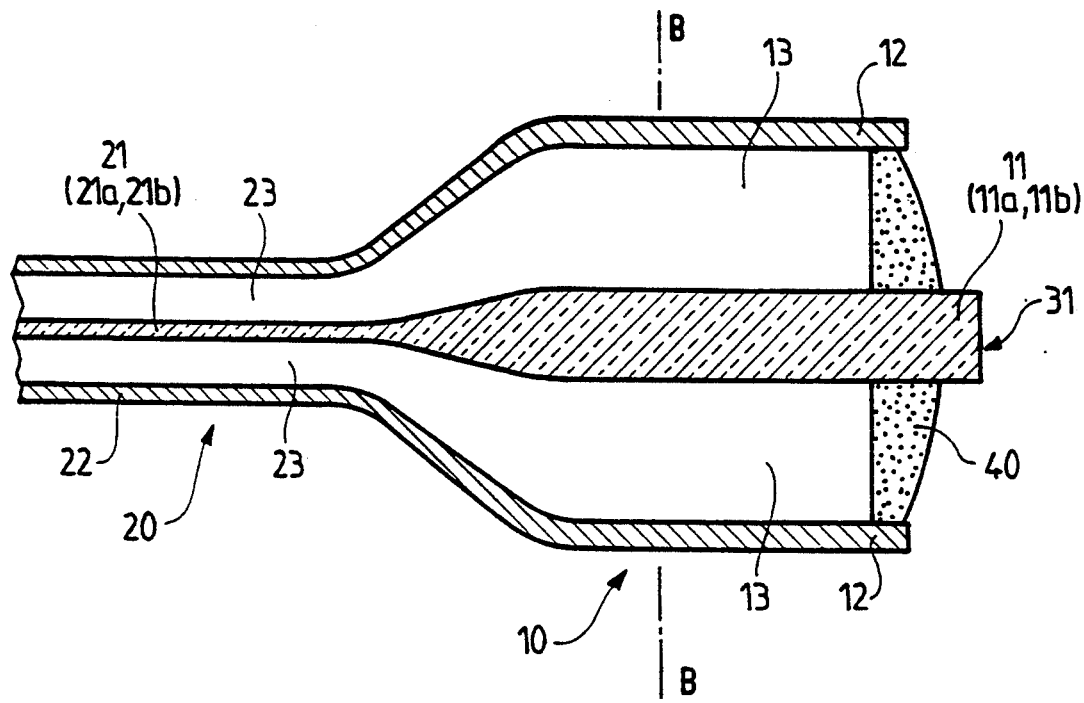
FIG. 3a is a longitudinal sectional view of a capacitive sensor suitable for operation in conformity with FIG. 1.

Referring to FIG. 3a, being a longitudinal sectional view of the sensor in accordance with the invention, the sensor comprises two parts: a sensor body 10 and a coaxial cable which is shielded by a mineral insulator 20. The coaxial cable comprises a core 21 which may be either a single central conductor 21a or a thermocouple 21b. The cable also comprises a tubular metallic sheath 22 which is insulated from the core by a compacted powdery mineral insulator 23. When the core is formed by a thermocouple, the wires are insulated from one another and are embedded in the powdery mineral insulator 23. The sensor body 10 comprises the extension 11 of the core 21, that is to say either the single central conductor 11a or the wires of the theromcouple, in this case denoted by the references 11b. The sensor body also comprises the extension 12 of the sheath 22 and the extension 13 of the mineral insulator 23.

FIG. 3b is a transverse sectional view, taken along the line B—B, of the sensor shown in FIG. 3a. The free end 31 of the core 21, 11 constitutes the conductive surface which is referred to as the first capacitor plate 1.

Figure 4B:
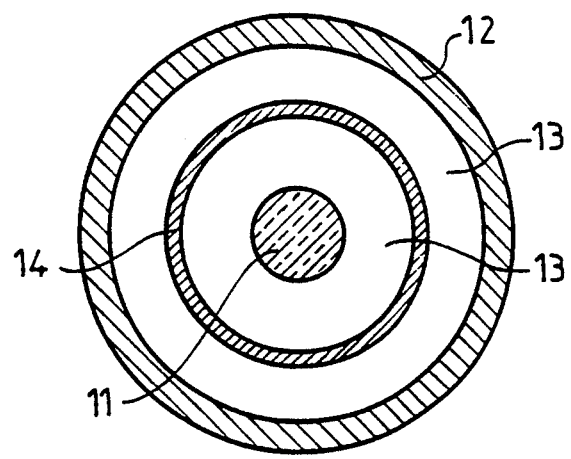
FIG. 4b is a transverse sectional view, taken along the line B—B, of the sensor shown in FIG. 3b.
Figure 4A:
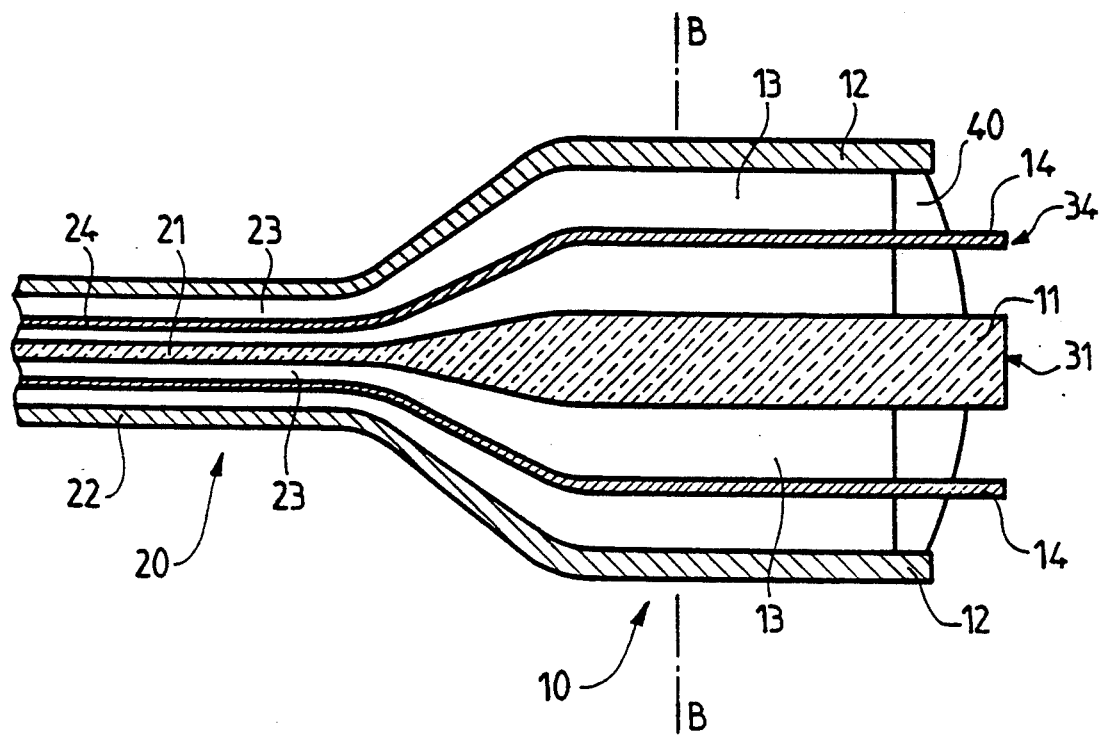
FIG. 4a is a longitudinal sectional view of a capacitive sensor suitable for operation in conformity with FIG. 2.

Referring to FIG. 4a, being a longitudinal sectional view of the sensor comprising an intermediate sheath or shielding ring, the sensor comprises, in the part of the coaxial cable, the coaxial metallic cylindrical sheath 24 which is insulated from the external sheath 22 and the core 21 by the mineral insulator 23. The body 10 of the sensor comprises the extension 14 of the intermediate sheath 24.

FIG. 4b is a transverse sectional view, taken along the line B—B, of the sensor shown in FIG. 4a. The free end 31 of the core 21, 11 constitutes the conductive surface which is referred to as the first capacitor plate 1 and the free end 34 of the intermediate sheath 24, 14 constitutes the supplementary conductive surface or capacitor plate 3.

In both sensors shown in the FIGS. 3a and 4a, the free ends 31 and 34 of the core and the intermediate sheath, respectively, constitute the conductive surface or plate 1 and the plate 3 of the above capacitors. The external sheath 22 is always connected to ground as well as in principle the second plate 2 of the capacitor.

The FIGS. 3b and 4b show that the intermediate sheath 14, 24 and the external sheath 12, 22 have a cylindrical shape and are coaxial.

As appears from FIGS. 3a and 4a, the diameter of the sensor body is preferably greater than the diameter of the coaxial cable. This offers the advantage that the sensor body can be readily chosen so as to have a diameter which is sufficiently large to perform the capacitance measurements and be fixed in its measuring position. This also offers the advantage that the coaxial cable has a small diameter so that it is sufficiently flexible to follow a winding path, notably for transporting the information to data processing systems remote from the position where the data is picked up, often being the centre of a turbo-engine.

The specific stucture of the sensor in accordance with the invention is obtained by a method which is very easy to carry out, and hence as inexpensive as possible.

It is to be noted that, as taught by the European Patent EP-0 145 060 in the name of THERMOCOAX, the realisation of a cable shielded by a mineral insulator implies the formation of a blank. This blank consists of a core which may be a single central conductor or, as in the case of the cited Patent, the wires of a thermocouple, and of a metallic cylindrical sheath. The spacing between the sheath and the core is filled with a powdery mineral insulator. The blank has a diameter which is from 1 to 10 times greater than the diameter of the finished cable. The blank is transformed into the ultimate cable is performed by successive mechanical drawing and hammering operations, interrupted by annealing at high temperatures. The finished cable thus exhibits a given flexibility.

In order to manufacture the capacitive sensor in accordance with the invention, a blank of uniform diameter is formed for the cable 20 and the body 10 of the sensor. Subsequently, the blank is subjected to known mechanical treatment. However, in the zone corresponding to the body 10 of the sensor, the diameter of the blank is reduced less than in the zone corresponding to the cable 20. This is readily realised in the course of successive mechanical and thermal operations.

Figure 5:
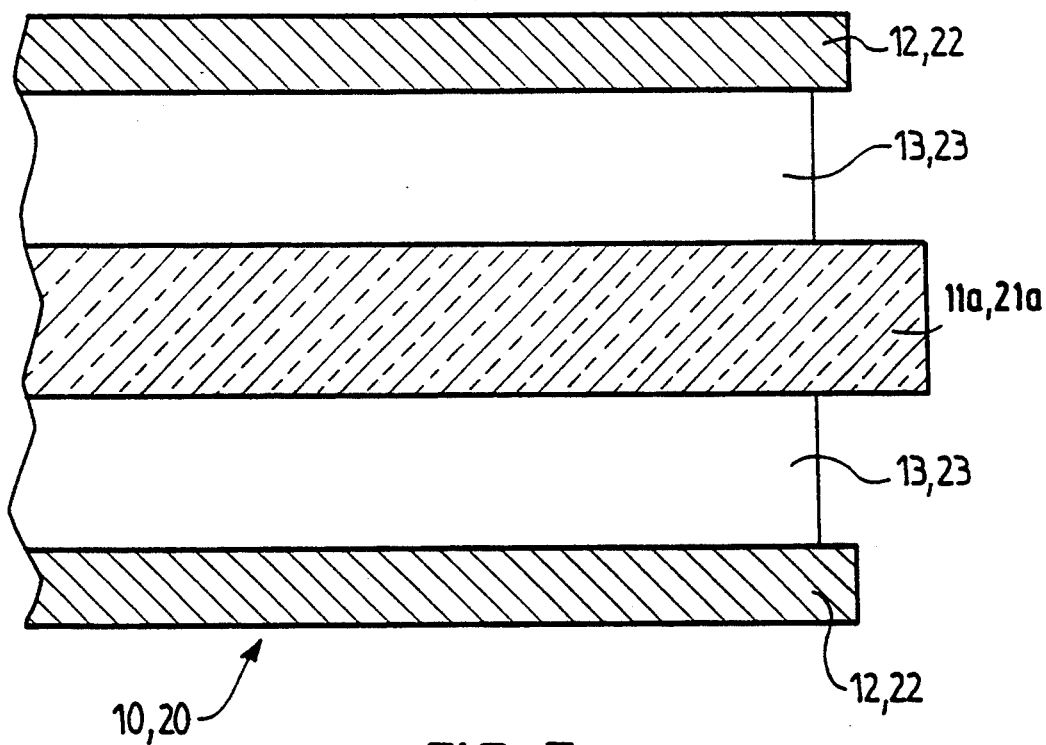
FIG. 5 is a longitudinal sectional view of a blank of a sensor whose core is formed by a single central conductor.
Figure 6:
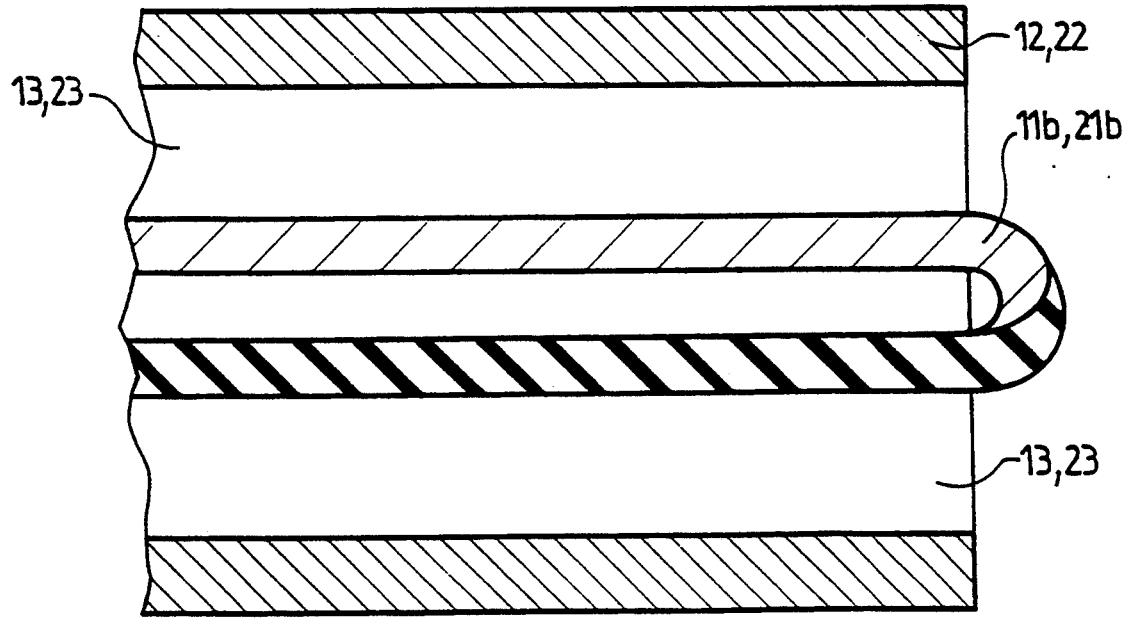
FIG. 6 shows a blank of a sensor whose core is formed by a thermocouple.

FIG. 5 illustrates a blank of a sensor having a core in the form of a single conductor 11a, 21a, and FIG. 6 illustrates a blank of a sensor having a core in the form of a thermocouple 11b, 21b. The latter blank comprises the wires 11b, 21b of the thermocouple, an external sheath 12, 22 and a mineral insulator 13, 23.

The materials preferably used for realising the described sensor are stated in Table I, together with the references of the various elements of the sensor.

The dimensions of the finished sensor are from 6 to 12 mm for the sensor body and from 1 to 2 mm for the cable. The cable may have a length of several meters.

In order to achiev tightness for the sensor, a cap 40 may be provided at the electrically open extremity of the sensor by sealing a refractory material to the metallic parts, that is to say the sheath or sheaths and the core, leaving exposed the extremity of the core and the extremity of the intermediate sheath, if any. This cap constitutes the only seal of the sensor. A method of realising this cap may include plasma vitrification.

TABLE I

| Central conductor single | 11a 21a | stainless steel or inconel or platinum |
| Central conductor thermocouple | 11b 21b | K = chromel-alumel, or N = nicrosil-nisil, or S = platimum-platinum rhodium alloy |
| Sheats | 22, 24 12, 14 | stainless steel or inconel |
| Mineral insulator | 23, 13 | Al$_2$O$_3$ or a mixture of oxides |
| Cap | 40 | vitrifiable ceramic |

TABLE I-continued refractory cement

We claim:

1. A capacitance sensor, comprising a sensor body which includes a housing, a conductive front surface and insulating means provided between the conductive surface and the housing, and also comprising a coaxial cable of the type shielded by a mineral insulator for connecting the conductive surface to a device for measuring the capacitance of the system formed by said conductive surface, constituting a first capacitor plate, and a reference conductive surface which is arranged opposite thereto and at a given distance therefrom and which constituted a second capacitor plate, characterized in that the sensor body consists of an electrically open extension of the coaxial cable shielded by a mineral insulator, the free end of the core constituting the conductive surface, whereas the extension of the sheath constitutes the housing and the insulation means are formed by the mineral insulator and characterized in that the diameter of the sensor body is at least two times greater than that of the cable.

2. A sensor as claimed in claim 1, characterized in that the cable and the sensor body comprise, between the core and the external sheath, a concentric metallic intermediate sheath which is insulated from the core and the external sheath by a compacted powdery mineral insulator in order to serve as a shielding ring.

3. A sensor as claimed in claim 2, characterized in that the free end of the sensor is provided with a refractory insulating cap which leaves the end of the core and of the intermediate sheath exposed.

4. A sensor as claimed in claim 2, characterized in that the core is a single central conductor.

5. A sensor as claimed in claim 2, characterized in that the core is formed by the wires of a thermocouple, the welding point of which constitutes the conductive surface for the measurement of a temperature as well as a capacitance.

6. A sensor as claimed in claim 1, characterized in that the core is a single central conductor.

7. A sensor as claimed in claim 1, characterized in that the core is formed by the wires of a thermocouple, the welding point of which constitutes the conductive surface for the measurement of a temperature as well as a capacitance.

8. A method of manufacturing a capacitive sensor, comprising:
   the formation of a blank having a diameter greater than or equal to that of a finished sensor body, a core which is formed by a single conductor or a thermocouple, one or two concentric metallic sheaths, and a powdery mineral insulating filler material,
   application of a mechanical process for successively reducing the diameter of the blank, by drawing and hammering interrupted by annealing at high temperatures, the zone of the cable being subject to a diameter reduction which is greater than that of the zone of the sensor body.

9. A method as claimed in claim 8, characterized in that a cap of a refractory material is sealed to the metallic parts, at the electrically open end of the sensor, leaving exposed the end of the core and the end of the intermediate sheath.

10. A method as claimed in claim 9, characterized in that the formation of the cap includes plasma vitrification.

* * * * *